April 14, 1936.  M. C. BARNETT  2,037,302
SAFETY GAS VALVE
Filed May 1, 1934

M. C. Barnett
Inventor

Patented Apr. 14, 1936

2,037,302

UNITED STATES PATENT OFFICE 2,037,302

SAFETY GAS VALVE

Mathew C. Barnett, Memphis, Tenn.

Application May 1, 1934, Serial No. 723,394

1 Claim. (Cl. 137—153)

This invention relates to safety valves designed for use in connection with gas lines, the primary object of the invention being to provide means for automatically cutting off the flow of gas through a pipe line, when the flow of gas pressure becomes so low that the flames of the burners supplied with gas, will be extinguished, thereby eliminating any possibility of the gas escaping through open burners, in the event that the normal gas flow is resumed.

Another object of the invention is to provide a safety valve of this character which may be opened or reset only by a manual operation of the resetting means, thereby permitting the normal flow of gas through the pipe line to the burners.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
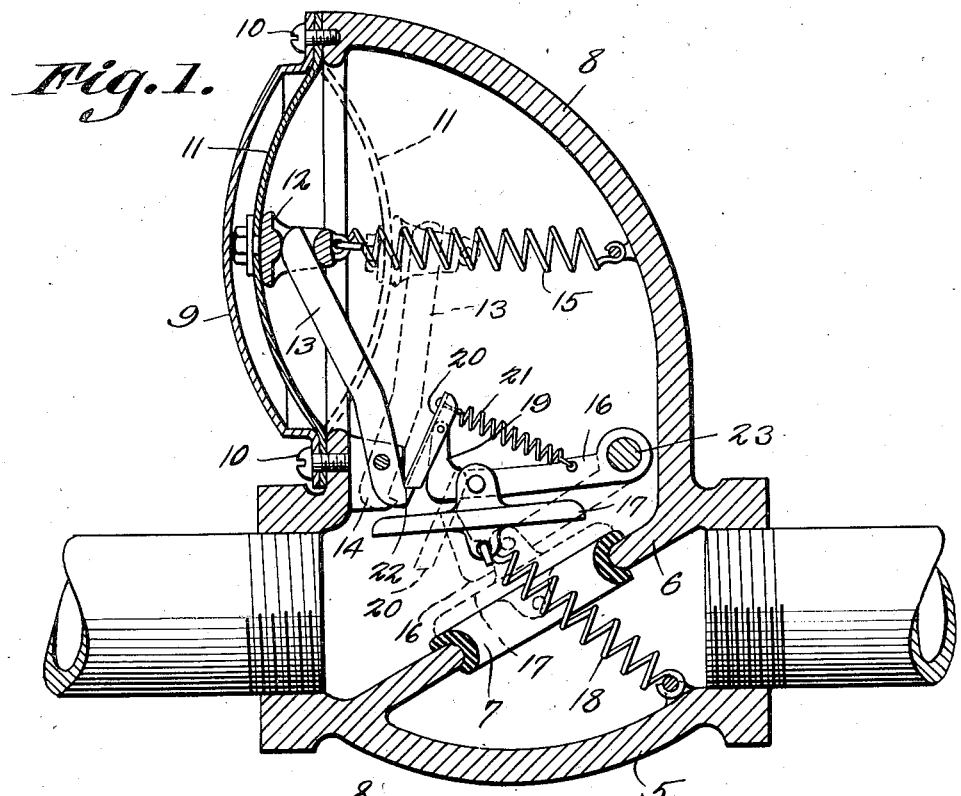
Figure 1 is a vertical sectional view through a valve constructed in accordance with the invention.
Figure 2:
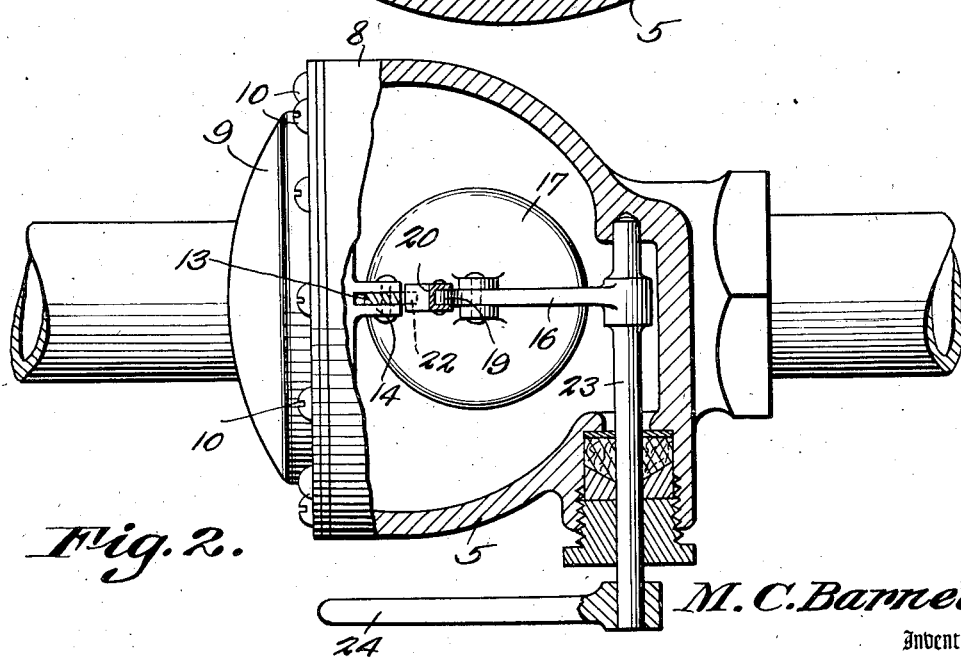
Figure 2 is a horizontal sectional view through the valve, parts of the valve being shown in elevation.

Referring to the drawing in detail, the reference character 5 designates the body portion of the valve, which is formed with a partition 6 dividing the valve body into an inlet section and an outlet section, the partition being provided with an opening 7, whereby the gas may flow through the valve body to the burners supplied with gas through the pipe line.

The valve body is formed with an upwardly extended offset portion 8, providing a diaphragm housing, the offset portion 8 being in communication with the intake section of the valve body, as shown by the drawing.

One side of the offset portion 8 is closed by means of the removable cover 9 which is formed with an annular flange through which the bolts 10 extend, the bolts also acting to secure the diaphragm 11 in position.

Secured centrally of the diaphragm, is a bearing member 12 formed with an opening to accommodate one end of the arm 13, which is pivotally mounted on the lug 14 extending inwardly from the body of the valve.

The reference character 15 designates a coiled spring which has connection with the bearing 12, the offset end of the spring being anchored to the wall of the diaphragm housing, the tension of the spring being such as to overcome the normal tension of the diaphragm 11, to the end that when gas pressure within the diaphragm housing is reduced beyond a certain degree, the diaphragm 11 will be moved to the dotted line position shown by Figure 1 of the drawing.

Disposed within the valve body, is a pivoted arm 16 which arm provides a support for the pivoted valve 17, which is adapted to move into engagement with the partition 6, directly over the opening 7, closing the opening and preventing the flow of gas through the body portion. A coiled spring indicated by the reference character 18 connects with the valve 17, and has one of its ends anchored to the body portion, to normally exert a pull on the valve 17 to seat the valve.

As clearly shown by Figure 1 of the drawing, one end of the arm 16 extends upwardly at 19, where it provides a support for the dog 20, which dog is operated by means of the coiled spring 21 to cause the dog to swing into engagement with the shoulder 22 formed at one end of the arm 13. Thus it will be seen that due to this construction, the dog 20 may be set to hold the valve 17 in its own position during the normal flow of gas through the valve body.

The arm 16 is secured to the shaft 23, which extends through the body portion of the valve, where it is supplied with a lever 24, which lever permits of the resetting of the valve.

The operation of the valve is as follows, assuming that the valve 17 is in a position as shown in Figure 1 of the drawing, and the gas pressure through the body portion is reduced. It is obvious that with the reduction of gas pressure within the diaphragm housing, the diaphragm 11 will be moved to the dotted line position, as shown by Figure 1, which movement swings the arm 13 to a position releasing the dog 20, whereupon the spring 18 acts to pull the valve 17 to a position closing the opening 7 and preventing the flow of gas through the valve body. Should the normal flow of gas through the valve body be resumed, the diaphragm 11 will be moved to its set position, or the position shown in full lines in Figure 1, and the valve 17 will remain in its closed position until the lever 24 has been manually operated to unseat the valve 17, which movement automatically moves the dog 20 to a position where it engages the shoulder 22, securing the valve 17 in an open position. It is obvious that the gas may now flow directly through the valve body and supply the burners connected with the pipe line within which the automatic valve is positioned.

Having thus described the invention, what is claimed is:

A safety valve comprising a body portion to be positioned in a gas line, a partition within the body portion, said partition having an opening formed with a valve seat, a transversely disposed shaft extending into the body portion, an arm mounted on the inner end of the shaft and disposed at right angles to the shaft, a valve pivotally mounted on the arm and adapted to close the opening in the partition, a spring for normally urging the valve towards the valve seat, a diaphragm closing one side of the body portion, an arm pivotally mounted within the body portion, one end of the arm being connected with the diaphragm, a spring pressed dog on the first mentioned arm for normally engaging the second mentioned arm holding the valve in its open position, a coiled spring within the body portion and urging the diaphragm inwardly against the gas pressure within the body portion, said arms adapted to move to seat the valve when the diaphragm moves inwardly and a lever on one end of the shaft whereby the safety valve may be reset.

MATHEW C. BARNETT.